UNITED STATES PATENT OFFICE.

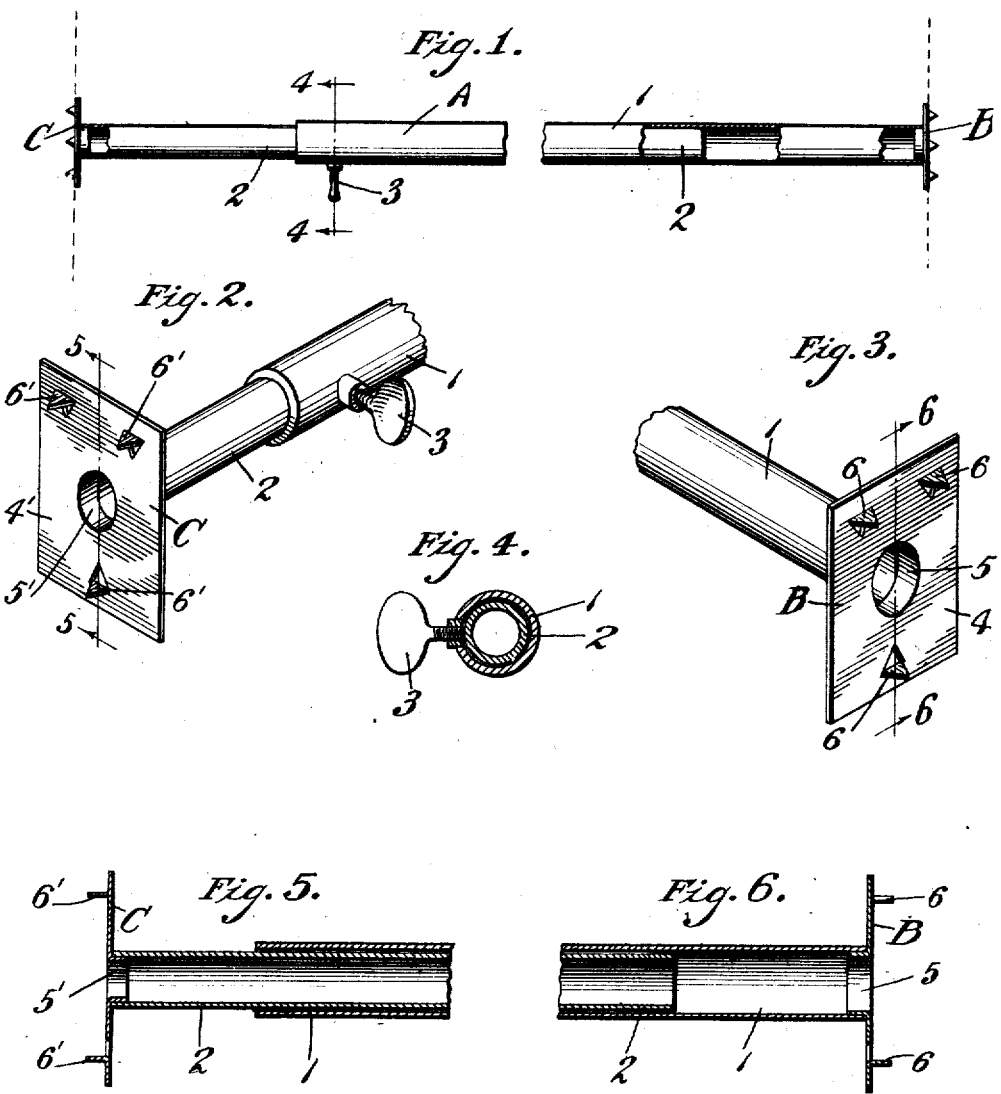

THEODORE E. CRECELIUS, OF ST. LOUIS, MISSOURI, ASSIGNOR TO MULTIPLEX DISPLAY FIXTURE COMPANY, OF ST. LOUIS, MISSOURI, A CORPORATION OF MISSOURI.

SUPPORTING-POLE AND BRACKET THEREFOR.

1,299,556.  Specification of Letters Patent.  Patented Apr. 8, 1919.

Application filed December 26, 1917. Serial No. 208,923.

*To all whom it may concern:*

Be it known that I, THEODORE E. CRECELIUS, a citizen of the United States, residing at the city of St. Louis, State of Missouri, have invented a certain new and useful Improvement in Supporting-Poles and Brackets Therefor, of which the following is a specification, reference being had to the accompanying drawings, forming a part thereof.

This invention relates to a certain new and useful improvement in supporting-poles and brackets therefor, the chief object of my present invention being to provide a pole of simple and economical construction adjustable in length to fit, or span the space, between the opposite walls of a closet, show-case, door-frame or the like and adapted especially for use in supporting or displaying clothes, curtains, and the like, and simple, inexpensive, and efficient separate and independent supporting brackets for such pole in the form of plates for facilitating mounting or securing of the pole in operative position, the brackets or plates being separate from the pole and readily and conveniently attachable to said walls and the pole being similarly readily and conveniently operatively engageable with the brackets without the use of nails, screws, or other such fastening members for connecting the opposite ends of the pole with the brackets.

With the above and other objects in view, my present invention resides in certain novel features of form, construction, arrangement and combination of parts, all as will hereinafter be described and afterward pointed out in the claims.

In the accompanying drawings,

Figure 1 is an elevational view, partly in section, of a supporting-pole and brackets therefor embodying my invention;

Fig. 2 is a perspective view of one of the brackets and a portion of the pole;

Fig. 3 is a similar view of the other bracket and another portion of the pole;

Fig. 4 is a cross sectional view through the pole on approximately the line 4—4, Fig. 1;

Fig. 5 is a longitudinal sectional view on approximately the line 5—5, Fig. 2; and Fig. 6 is a similar view on approximately the line 6—6, Fig. 3.

Referring now more particularly to the id drawings, in which like reference characters refer to like parts throughout the several views, A indicates the pole, which comprises an outer tubular member or bar 1, comprising a piece of simple, plain, or ordinary tubing telescopically fitting adjustably within which is an inner preferably tubular member or bar 2, also comprising a piece of simple, plain, or ordinary tubing, a set-screw or the like 3 fitted in a screw-threaded opening or bushing in the outer bar 1 being adapted to impingingly engage the outer surface of the inner bar 2 to lock the pole-members 1 and 2 together in adjusted positions when in place upon the supporting brackets to be referred to. Thus the pole A is adjustable in length to conveniently fit closets, show-cases, door-frames, and the like of different and various widths.

For convenient and facile mounting of the pole A in supporting or display position, I provide the brackets B and C. These brackets, as I call them, are substantially identical in form and construction, except as hereinafter stated; hence but one of the brackets, as, for instance, bracket B, will be here specifically described. This bracket B is in the form of a preferably rectangular thin metallic plate 4 integrally provided approximately centrally on one face with a plain or straight approximately circular and tubular boss 5 of suitable diameter to fit the inner diameter of outer member 1 of pole A and formed preferably by punching or upsetting the metal of the plate. Suitably adjacent its margin and also suitably spaced around the boss 5, the plate 4 is further provided also preferably integrally with a plurality of (preferably three) attaching-prongs 6 formed also by punching or upsetting the metal of the plate.

The bracket C, being, as stated, substantially identical with bracket B, similarly comprises a plate 4' provided with the integral boss 5' and attaching-prongs 6', the boss 5', however, being of somewhat less diameter than the diameter of boss 5 of bracket B to neatly and snugly fit within the inner member or bar 2 of the pole.

In use or operation, the prongs 6 and 6' of the respective brackets B and C are, under suitable pressure or force applied to the plates 4 and 4', respectively, driven into engagement with the opposite walls of the particular closet, show-case, door-frame, or the like, the brackets when so attached being, as seen in Fig. 1, oppositely disposed. The outer end of outer pole-member 1 is then fitted upon the boss 5 as shown and the inner pole-member 2 adjustably projected to fit at its outer end upon the boss 5' of opposite bracket C, the pole-members 1 and 2 being then locked by means of the screw 3 in adjusted position with their outer ends encircling and fitting upon and supported by the bosses 5 and 5' of the brackets. Thus the pole 2 is secured to or mounted upon the brackets and the brackets secured to or mounted upon said walls without the use of nails, screws, or other such fastening means, and at the same time both the pole and the brackets are most conveniently and readily mounted or secured in operative position. My new brackets are simple in form and construction and may be inexpensively manufactured; and I may add that I have found from experience that a pole A, mounted and supported as described and shown by the brackets B and C, will support relatively heavy loads, the greater the stress or tension on the pole the more positively and rigidly do the plates 4 and 4' engage the said walls.

By constructing the brackets B and C of thin metal plates and punching and bending up the thin and pointed attaching prongs therefrom, the brackets are especially adapted to be attached to plaster walls and without any very perceptible damage to the walls, and by providing three attaching prongs as herein shown, a more efficient anchoring of the plates is secured against dislodgment in applying the pole after the plates are fixed in place, and when the pole is in use.

I am aware that minor changes in the form, construction arrangement, and combination of the several parts of my new supporting-pole and brackets may be made and substituted for those herein shown and described without departing from the nature and principle of my invention.

Having thus described my invention, what I claim and desire to secure by Letters Patent is:

1. A supporting bracket for curtain poles and the like, constructed of a thin plate of sheet metal, having a substantially central, plain, straight, tubular pole-supporting boss struck-up therefrom and projecting on one side of the plate, and fastening spurs also struck-up from the plate and projecting from the opposite side thereof adapted to secure the bracket in place.

2. In combination, a pole, comprising straight pieces of plain tubing of different diameters and adapted to be telescopically and slidably fitted one within the other, means for holding the tubes in adjusted position and supporting brackets for said pole, each comprising a thin plate having a substantially central, plain, straight tubular boss struck-up therefrom and projecting on one side of the plate, and fastening spurs struck-up therefrom and projecting from the opposite side of the plate to secure said brackets in place, the said bosses adapted to fit and frictionally engage the opposite ends of the tubular members of the pole to support the pole in place.

3. In combination, a pole, comprising straight pieces of plain or ordinary tubing of different diameters and adapted to be telescopically and slidably fitted one within the other, and supporting brackets for said pole, each comprising a thin plate having a substantially central, plain, straight, tubular boss struck-up therefrom and projecting from one side thereof, and fastening spurs also struck-up from the plate and projecting from the opposite side thereof to secure the brackets in place, the said bosses adapted to fit and frictionally engage the opposite ends of the tubular members of the pole to support the pole in place, and a set screw fitted in and carried by the outer member of the pole and adapted to engage the outer surface of the inner member of the pole to lock the members of the pole together when adjusted to supporting position upon the bosses of said brackets.

In testimony whereof, I have signed my name to this specification.

THEODORE E. CRECELIUS.